Aug. 25, 1925.  1,551,036
F. J. LAPOINTE
BROACHING TOOL
Filed Feb. 26, 1924
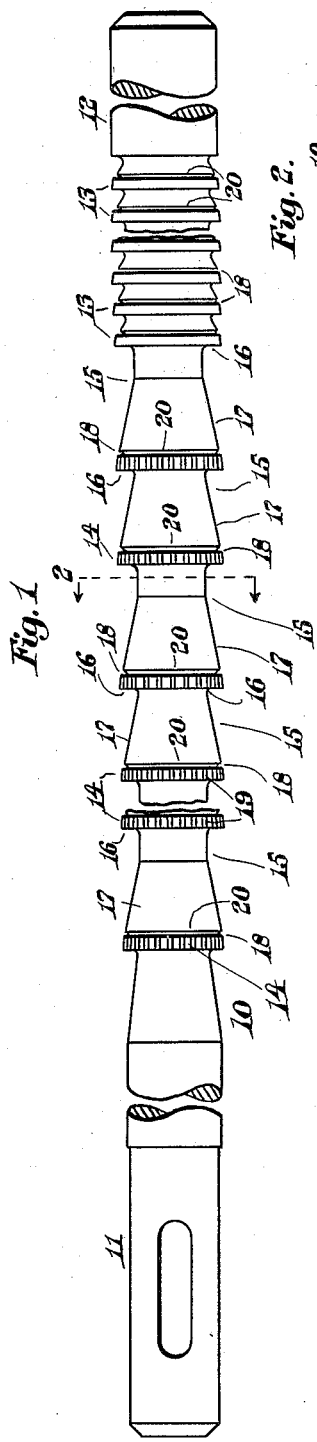
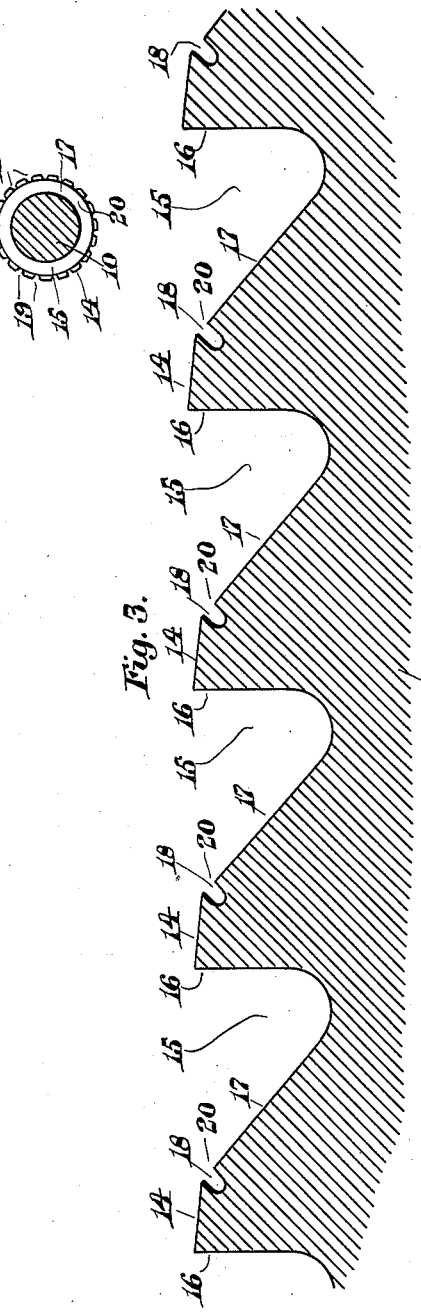
Inventor:
Frank J. Lapointe,
by Walter E. Lombard.
Atty.

Patented Aug. 25, 1925.

1,551,036

UNITED STATES PATENT OFFICE.

FRANCIS J. LAPOINTE, OF ANN ARBOR, MICHIGAN.

BROACHING TOOL.

Application filed February 26, 1924. Serial No. 695,332.

*To all whom it may concern:*

Be it known that FRANCIS J. LAPOINTE, a citizen of the United States of America, and a resident of the city of Ann Arbor, in the county of Washtenaw, in the State of Michigan, has invented certain new and useful Improvements in Broaching Tools, of which the following is a specification.

This invention relates to broaching tools and particularly to tools of this class designed to cut and finish round holes and has for its object the production of a tool of this character which may be ground after slight distortion in tempering in order to bring the cutting portions thereof into alinement with an equal thickness throughout their diameter.

This invention consists in forming the peripheries of the teeth or cutting portions of an equal thickness with a peripheral groove between the back of each tooth and the adjacent cone-shaped connecting portion at the rear of said tooth.

The invention further consists in certain novel features of construction and arrangement of parts which will be understood readily by reference to the description of the drawings and to the claims to be hereinafter given.

For the purpose of illustrating the invention, one preferred form thereof is illustrated in the drawings, this form having been found to give satisfactory and reliable results although it is to be understood that the various instrumentalities of which the invention consists can be variously arranged and organized and the invention is not limited to the precise arrangement and organization of these instrumentalities as herein shown and described except as required by the scope of the appended claims.

Of the drawings:

Fig. 1 represents an elevation of a broach embodying the principles of the present invention.

Fig. 2 represents a section of same on line 2—2 on Fig. 1, and

Fig. 3 represents a greatly enlarged sectional detail showing the differences in formation of the successive teeth.

Similar characters indicate like parts throughout the several figures of the drawings.

In the drawings, 10 is a member having a cylindrical portion 11 at one end and another cylindrical portion 12 at the opposite end.

The portion 12 is of larger diameter than the portion 11 and is adapted to burnish the hole when the broaching has been completed.

Adjacent to the cylindrical portion 12, the member 10 is provided with a plurality of annular cutting members 13 having the same diameter as the portion 12.

These cutting members 13 are preferably spaced an equal distance apart.

Between these cutting members 13 and the portion 11 are a plurality of cutting members 14 which are spaced from each other a distance considerably greater than the distance between the cutting members 13.

Preferably the space between every alternate pair of cutting members 14 is greater than the space between the other pairs as clearly indicated in the drawings.

Usually in broaches of this character, the cutting members 13 and 14 are backed off slightly from the cutting edge, and the member 10 is then provided with a groove 15 to receive the chips cut by the tool.

One wall of this groove 15 forms the front face 16 of the cutting members 13, 14 while the other wall 17 is inclined to the rear edge of the cutting tooth.

Each cutting member 14 has a diameter slightly greater than the cutting member in advance thereof.

When the broaches are straightened in the manufacture thereof, it is extremely difficult to straighten them so that they will run true within .005 to .010 of an inch and it is often necessary to grind them running this much out of true.

The consequence is that it is difficult to secure a perfectly round periphery as some parts of the periphery will be wider than other parts and this prevents the grinding wheel from cutting as freely when on a wider portion as it does on a narrow portion of said periphery.

This is particularly true in the manufacture of small broaches.

This is also true when the teeth are backed off in an attempt to secure a uniform land for a cutting edge.

Unless the land is of uniform width, an imperfect result will be obtained during the broaching operation due to the fact that if one side of the land is wider than another side, it will cut freer on that side and will crowd the broach over to one side with the result that a hole is produced that is not in proper relation to the original hole in the work being operated upon.

By providing the inclined groove 18 at the rear of each cutting member 13 or 14, these difficulties are entirely obviated and a perfectly round tooth may be ground and when the broach is in use, owing to the uniform width of periphery of the tooth, a perfectly round hole will be cut in proper relation to the original hole in the work.

Moreover, the construction of the broach is greatly simplified by making the teeth with the groove 18 therein.

Obviously a broaching tool made in the usual manner and operating imperfectly may be made operable by cutting the peripheral grooves 18 therein parallel with the front face of each cutting member 13 or 14.

It is essential that the groove 18 should be formed parallel with the front face of a cutting tooth 13 or 14, for in the construction of the broach, the device must be tempered before the cutting members 14 are ground, and in tempering the broach is liable to become distorted and while distorted the cutting members must be ground so that these members will be in axial alinement when the grinding is completed.

The teeth 14 are preferably provided with a plurality of peripheral nicks or indentations 19, the nicks in each tooth being out of alinement with the nicks in the teeth adjacent thereto.

If the larger end of the cone-shaped portions 17 registered with the periphery of the cutting members 14, it is obvious that with the entire tool distorted to some extent, when the grinding of the cutting member 14 is effected, the width or thickness of the periphery of the cutting member would be liable to vary at different points about the periphery.

In such a case, the tool would operate imperfectly and would not cut a clean, round hole, but would, on the contrary, be liable to move sidewise to some extent and the hole cut would, as a consequence, be out of round.

This would be very objectionable and to obviate this difficulty, applicant has provided the larger end of the cone-shaped connecting portion with a groove 18 which is cut in under the periphery of the cutting tooth at an angle, thereby leaving a corner 20 at the larger end of said connecting portion which has a diameter slightly less than the diameter of said cutting tooth.

The cone-shaped portions 17 stiffen the tool and reduce to a minimum the distortion during the tempering.

By forming the corner 20 at the larger end of the connecting portion 17 at a point slightly inside the periphery of the cutting tooth 14 the cutting teeth may be ground after the tool has been distorted in tempering and leave the periphery of each tooth of equal thickness throughout.

This desired result may be obtained when the groove 18 has been cut into the tool, even if the portions 17 are slightly out of alinement and a tool formed in which the cutting members will be in alinement and capable of cutting a round hole without any tendency for the tool during the cutting operation to veer sidewise.

The present invention is similar to that in application Serial No. 632,318, filed by me April 16, 1923.

It is believed that the operation and many advantages of the invention will be apparent without further description.

Having thus described my invention, I claim:

1. A device of the class described, provided with a plurality of spaced cutting members, connected by portions having a reduced diameter, each connecting portion having a peripheral groove formed therein at the back of and parallel to the front face of each cutting member.

2. A device of the class described, provided with a plurality of spaced cutting members, connected by portions having a reduced diameter, each connecting portion having a peripheral inclined groove formed therein at the back of and parallel to the front face of each cutting member.

3. A device of the class described, provided with a plurality of spaced cutting members, connected by portions having a reduced diameter, each connecting portion having a peripheral inclined groove formed therein at the back of and parallel to the front face of each cutting member, said groove extending beneath the periphery of the cutting member.

4. A device of the class described, provided with a plurality of spaced cutting members, connected by cone-shaped portions having a reduced diameter, each connecting portion having a peripheral groove formed therein at the back of and parallel to the front face of each cutting member.

5. A device of the class described, provided with a plurality of spaced cutting members connected by reduced portions and having parallel front faces and forwardly inclined back faces parallel to said front faces.

6. A device of the class described, provided with a plurality of spaced cutting members connected by cone-shaped portions the peripheries of the larger ends of which adjacent said cutting members are inclined both to said cone-shaped portions and the peripheries of said cutting members.

7. A device of the class described provided with a plurality of spaced cutting members connected by cone-shaped portions the walls of which are inclined towards the rear edges of the peripheries of said members, each cone-shaped portion having an annular groove formed therein of which one wall extends to the rear edge of the periphery of the cutting member.

8. A device of the class described provided with a plurality of spaced cutting members connected by cone-shaped portions the walls of which are inclined towards the rear edges of the peripheries of said members, each cone-shaped member having an annular groove therein, the walls of which are perpendicular to the inclined wall of said connecting portion, and one of which terminates at the rear edge of the periphery of said cutting member.

Signed by me at Ann Arbor, Michigan, this 18th day of February, 1924.

FRANCIS J. LAPOINTE.